(12) United States Patent
Hashimoto

(10) Patent No.: US 11,850,758 B2
(45) Date of Patent: Dec. 26, 2023

(54) SYSTEM FOR CORRECTING ROBOT OPERATIONS AMONG SIMULTANEOUSLY AUTOMATICALLY OPERATED ROBOTS

(71) Applicant: KAWASAKI JUKOGYO KABUSHIKI KAISHA, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 118 days.

(21) Appl. No.: 16/756,060

(22) PCT Filed: Oct. 12, 2018

(86) PCT No.: PCT/JP2018/038087
§ 371 (c)(1),
(2) Date: Apr. 14, 2020

(87) PCT Pub. No.: WO2019/087738
PCT Pub. Date: May 9, 2019

(65) Prior Publication Data
US 2020/0298408 A1  Sep. 24, 2020

(30) Foreign Application Priority Data

Oct. 31, 2017  (JP) ................................ 2017-211372

(51) Int. Cl.
*B25J 9/16* (2006.01)
*B25J 3/00* (2006.01)
(Continued)

(52) U.S. Cl.
CPC ........... *B25J 9/1689* (2013.01); *B25J 9/1674* (2013.01); *B25J 9/1682* (2013.01); *B25J 3/00* (2013.01);
(Continued)

(58) Field of Classification Search
CPC . B25J 9/1682; B25J 3/04; B25J 9/1664; B25J 9/1674; B25J 18/04; B25J 9/1602;
(Continued)

(56) References Cited

U.S. PATENT DOCUMENTS 8,972,059 B2 * 3/2015 Moriyama ............. B25J 9/1633
 700/258
9,393,699 B1 * 7/2016 Jules ...................... B25J 9/1656
(Continued)

FOREIGN PATENT DOCUMENTS

DE  102016012333 A1 * 4/2017 ............. B25J 9/161
EP   3 342 551 A1   7/2018
(Continued)

*Primary Examiner* — Abby Y Lin
*Assistant Examiner* — Karston G. Evans
(74) *Attorney, Agent, or Firm* — Oliff PLC

(57) ABSTRACT

A robot system includes robot bodies, operation devices each configured to accept operation and generate operational information for causing the robot body to operate, motion controllers configured to control operation of the corresponding robot body in response to the operational information, operation target selectors configured to receive an operation for selecting any of the robot bodies and request a permission to operate the selected robot body based on the operational information from the corresponding operation device, and an operation permitting device having a determinator configured to receive the permission request from the operation target selector and determine whether a permission is to be granted for the permission request. When the permission request is received, and the operation of the robot body selected by the operation target selector based on the operational information from a different operation device is permitted, the determinator prohibits the permission to the permission request.

11 Claims, 7 Drawing Sheets

(51) Int. Cl.
*B25J 13/06* (2006.01)
*B25J 13/00* (2006.01)

(52) U.S. Cl.
CPC ............ *B25J 9/1664* (2013.01); *B25J 13/006* (2013.01); *B25J 13/06* (2013.01); *G05B 2219/39448* (2013.01); *G05B 2219/40153* (2013.01)

(58) Field of Classification Search
CPC . B25J 9/1689; B25J 3/00; B25J 9/0084; B25J 13/006; B25J 13/06; G05B 2219/35468; G05B 2219/35472; G05B 2219/40153; G05B 2219/40169; G05B 2219/40306; G05B 2219/40399; G05B 2219/39448; G05B 19/418; G05B 2219/39; G05B 2219/39001
See application file for complete search history.

(56) References Cited

U.S. PATENT DOCUMENTS

| | | | | |
|---|---|---|---|---|
| 9,457,468 | B1 * | 10/2016 | Elazary | .................... B25J 9/161 |
| 10,737,377 | B2 * | 8/2020 | Fulop | ..................... B25J 9/0087 |
| 10,806,534 | B2 * | 10/2020 | Hashimoto | ............ B25J 13/084 |
| 11,154,981 | B2 * | 10/2021 | Hanrahan | .............. G06Q 10/06 |
| 2007/0005045 | A1 * | 1/2007 | Mintz | ...................... B25J 19/00 606/1 |
| 2009/0299524 | A1 | 12/2009 | Evans et al. | |
| 2010/0172733 | A1 | 7/2010 | Chalubert et al. | |
| 2013/0345875 | A1 * | 12/2013 | Brooks | .................. B25J 9/1671 700/258 |
| 2017/0050321 | A1 * | 2/2017 | Look | ................ G06Q 10/06398 |
| 2017/0113343 | A1 * | 4/2017 | Inaba | .................... B25J 9/0084 |
| 2017/0144297 | A1 * | 5/2017 | Takaichi | ................ B25J 9/0096 |
| 2018/0189748 | A1 * | 7/2018 | Anderson | ........ G06Q 10/06311 |
| 2018/0215039 | A1 * | 8/2018 | Sinyavskiy | ......... A47L 11/4011 |
| 2018/0232839 | A1 * | 8/2018 | Heinla | .................. G05D 1/0088 |
| 2018/0243921 | A1 * | 8/2018 | Hashimoto | .............. B25J 9/163 |
| 2018/0284760 | A1 * | 10/2018 | Gupta | .................... B25J 13/006 |
| 2020/0147793 | A1 * | 5/2020 | Larson | .................. B25J 9/1628 |

FOREIGN PATENT DOCUMENTS

| | | | |
|---|---|---|---|
| EP | 3 342 558 | A1 | 7/2018 |
| JP | H07-129231 | A | 5/1995 |
| JP | 2003-275975 | A | 9/2003 |
| JP | 2003-311661 | A | 11/2003 |
| JP | 2005219147 | A * | 8/2005 |
| JP | 2009-531184 | A | 9/2009 |
| JP | 4639343 | B2 * | 2/2011 |
| JP | 5011474 | B2 | 8/2012 |
| JP | 5070441 | B2 * | 11/2012 |
| JP | 2016-78142 | A | 5/2016 |
| JP | WO2017/033356 | A1 | 6/2018 |
| WO | 2017/033376 | A1 | 3/2017 |

* cited by examiner

SYSTEM FOR CORRECTING ROBOT OPERATIONS AMONG SIMULTANEOUSLY AUTOMATICALLY OPERATED ROBOTS

TECHNICAL FIELD

The present disclosure relates to a robot system.

BACKGROUND ART

Conventionally, a remote control robot system capable of causing a robot to perform a necessary work by an operator remotely manipulating the robot in a work environment is known.

For example, Patent Document 1 proposes a robot system capable of switching an operation mode from an automatic operation mode in which a robot is operated according to a preset task program to a manual operation mode in which an operator manipulates the robot by manually operating a user interface, such as a master arm. This system is possible, when an abnormality, such as the program prepared beforehand is not able to cause the robot to perform a given work, to cause the robot to perform the work by switching the operation mode from the automatic operation mode to the manual operation mode.

REFERENCE DOCUMENT OF CONVENTIONAL ART

Patent Document

[Patent Document 1] JP2003-311661A

DESCRIPTION OF THE DISCLOSURE

Problems to be Solved by the Disclosure

Meanwhile, for example, when a target work ranges a wide variety of operations or the target work requires a plurality of operation processes, it is efficient to prepare tens of robots which carry out the operations or processes simultaneously. However, when the system described above is applied to the plurality of robots, the same number of user interfaces as the robots must be prepared in order for operators to perform the manual operation.

Therefore, the present disclosure aims at providing a robot system suitable for remotely controlling a plurality of robots.

SUMMARY OF THE DISCLOSURE

In order to solve the above problems, a robot system according to the present disclosure includes a plurality of robot bodies, a plurality of operation devices, each configured to accept operation and generate operational information for causing the robot body to operate, a plurality of motion controllers provided corresponding to the plurality of robot bodies, respectively, and configured to control operation of the corresponding robot body in response to the operational information, a plurality of operation target selectors provided corresponding to the plurality of operation devices, respectively, and configured to receive an operation for selecting any of the plurality of robot bodies and request a permission to operate the selected robot body based on the operation information from the corresponding operation device, as a target to be operated, and an operation permitting device having a determinator configured to receive the permission request from the operation target selector and determine whether a permission is to be granted for the permission request, and when the determinator grants the permission, enable the operation of the selected robot body based on the operation information from the corresponding operation device. When the permission request is received from the operation target selector, and the operation of the robot body selected by the operation target selector based on the operational information from a different operation device from the operation device corresponding to the operation target selector is permitted, the determinator prohibits the permission to the permission request, or otherwise, grants the permission to the permission request.

According to this configuration, for example, even when an abnormality occurs to some of the plurality of robots and the operation is to be switched to the manual operation, it is possible to operate all the robots from one operation device, if the permission is granted from the operation permitting device. Therefore, it becomes unnecessary to prepare the same number of operation devices for the operators to manipulate the robot bodies as the number of robot bodies.

Moreover, in response to the reception of the permission request from the operation target selector, when the robot body selected by the operation target selector is permitted to operate based on the operational information from a different operation device from the operation device corresponding to the operation target selector, the permission to the permission request is prohibited. Thus, it is avoidable that one robot body is simultaneously manipulated from the plurality of operation devices.

Therefore, the robot system suitable for remotely controlling a plurality of robots, can be provided.

The robot system may include a plurality of request generators provided corresponding to the plurality of motion controllers, respectively, and configured to generate an operation request for requesting the operation information, and a request informer configured to inform that the request generator generates the operation request. According to this configuration, the operator is able to immediately know for which motion controller the operation request is generated.

The robot system may include a memory configured to store automatic operational information for causing the robot body to operate automatically. Before the request generator generates the operation request, an operation mode of the motion controller may be an automatic mode in which the operation of the robot body is controlled using the automatic operational information, and when the request generator generates the operation request, the operation mode may be switched from the automatic mode to a manual mode in which the operation of the robot body is controlled using the operational information.

The robot system may include a memory configured to store automatic operational information for causing the robot body to operate automatically. While the robot body operates automatically using the automatic operational information stored in the memory, the motion controller may control the operation of the robot body by using both the automatic operational information and the operational information, when the operational information is received from the operation device.

The operation device may be configured to be specifiable of a workpiece that is an object to be worked by the robot body, and the operational information may include workpiece information specified by the operation device. The motion controller may control the corresponding robot body in response to the operational information so that the robot body operates to perform a work to the workpiece specified by the operation device.

Effect of the Disclosure

The present disclosure can provide the robot system suitable for remotely controlling a plurality of robots.

MODES FOR CARRYING OUT THE DISCLOSURE

First Embodiment

Hereinafter, a robot system according to a first embodiment of the present disclosure is described with reference to the drawings. A robot system 100 according to this embodiment is a system utilizing a robot of a master-slave type. In the robot system 100, as an operator who is located at a position distant from a workspace of a slave arm 1 (outside the workspace) moves a master arm 2 (see FIG. 4) to input an instruction, the slave arm 1 moves corresponding to the instruction to perform a specific work. Moreover, in the robot system 100, the slave arm 1 can also automatically perform a given work, without the operator's operation of the master arm 2.

An operation mode in which the slave arm 1 is operated according to the instruction inputted through the master arm 2 is herein referred to as a "manual mode." Note that the "manual mode" also includes a case where a part of the operation of the slave arm 1 under operation based on the instruction inputted by the operator operating the master arm 2 is automatically corrected. Moreover, an operation mode in which the slave arm 1 is operated according to the preset task program is referred to as an "automatic mode."

Further, the robot system 100 of this embodiment is configured to be able to correct operation of the slave arm 1 to be carried out automatically during the automatic operation of the slave arm 1 by reflecting the manipulation of the master arm 2 to the automatic operation of the slave arm 1. An operation mode in which the slave arm 1 is operated according to the preset task program in a state where the instruction inputted through the master arm 2 can be reflected to the operation of the slave arm 1 is herein referred to as a "correctable automatic mode." Note that the "automatic mode" is distinguished from the "correctable automatic mode" in that the operation of the master arm 2 is not reflected to the operation of the slave arm 1 when the operation mode in which the slave arm 1 is operated is the automatic mode.

Figure 1:
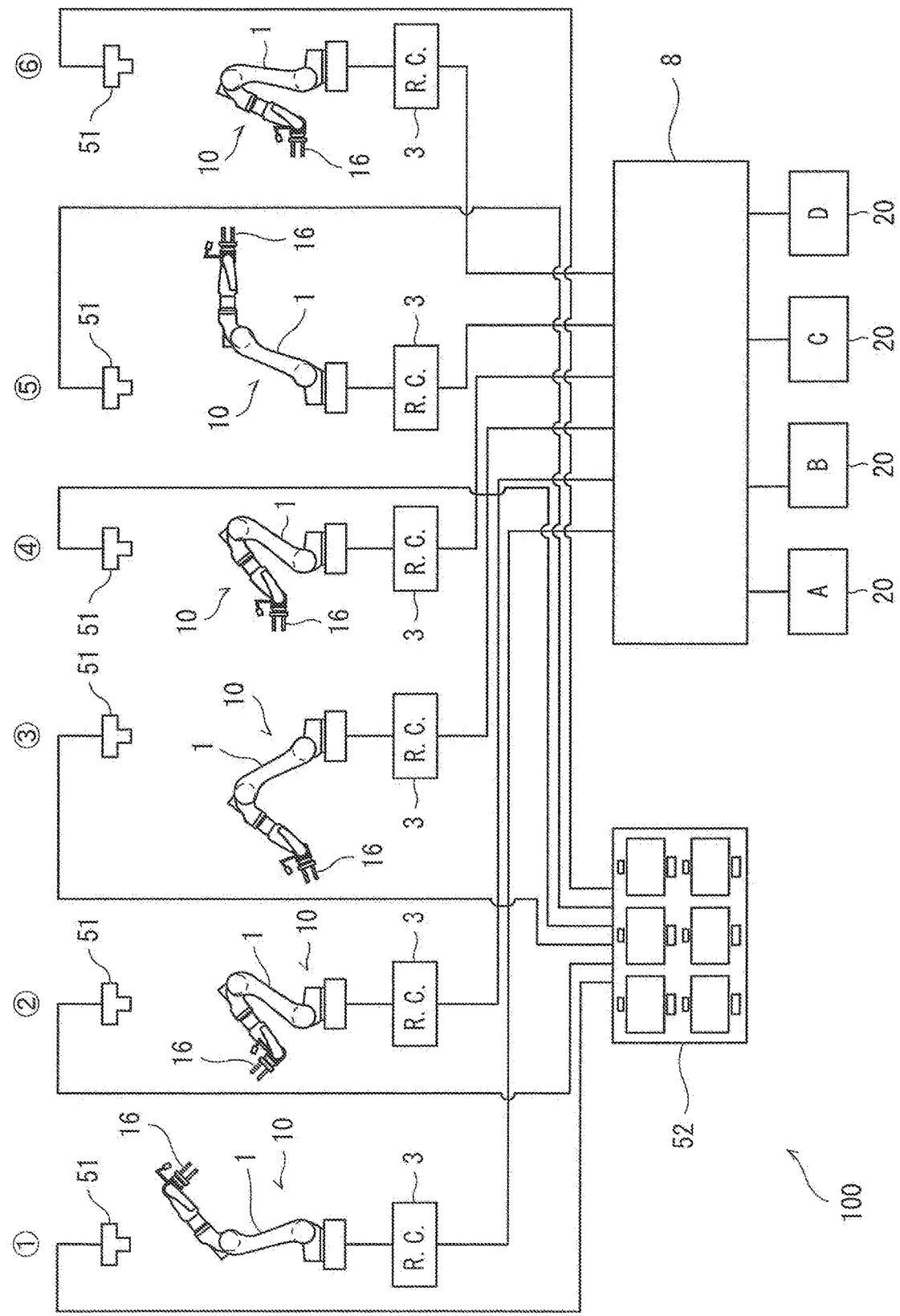
FIG. 1 is a schematic diagram illustrating a configuration of a robot system according to a first embodiment.

First, referring to FIG. 1, a configuration of the robot system 100 according to this embodiment is described. FIG. 1 is a schematic diagram illustrating one example of the configuration of the robot system 100 according to this embodiment. As illustrated in FIG. 1, the robot system 100 includes a plurality of slave robots 10, and a plurality of operator interface systems 20 including the respective master arms 2. As illustrated in FIG. 1, as one example, the robot system 100 of this embodiment includes six slave robots 10 and four operator interface systems 20. Note that the number of slave robots 10 and the number of operator interface systems 20 provided to the robot system 100, are not limited to the number of this configuration. Moreover, these six slave robots 10 and four operator interface systems 20 are connected to an operation permitting device 8, which will be described later. Below, each component of the robot system 100 is described in detail.

(Configuration of Slave Robot)

As illustrated in FIG. 1, each slave robot 10 includes a slave arm 1, an end effector 16 attached to a tip end of the slave arm 1, and a control device 3 which governs operation of the slave arm 1 and the end effector 16. The slave arm 1 and the end effector 16 correspond to a "robot body" of the present disclosure. In this embodiment, although all the six slave robots 10 have the same configuration, they may have different configurations.

Figure 2:
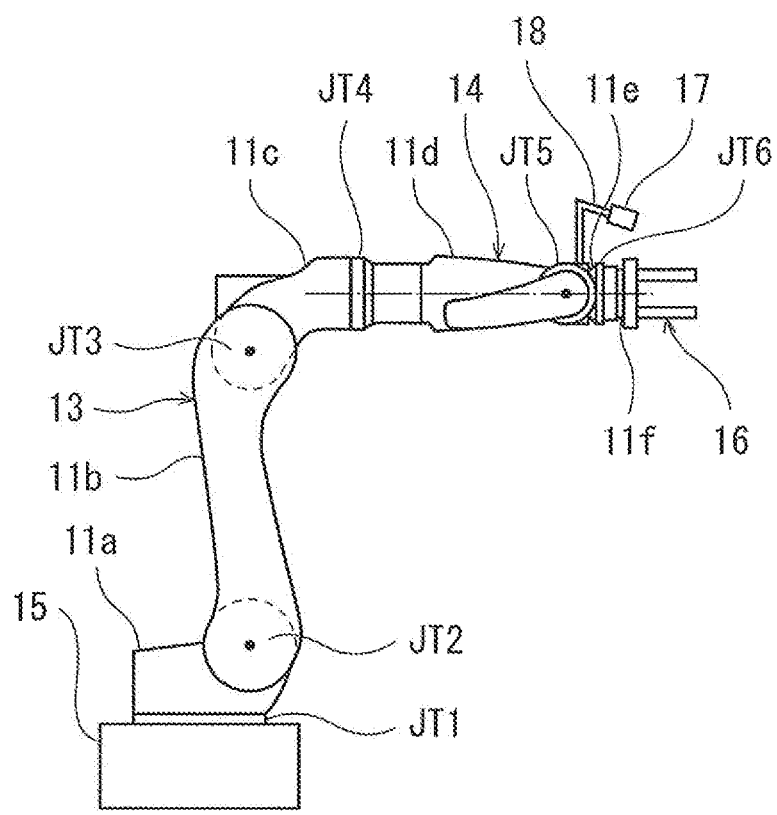
FIG. 2 is a view illustrating a configuration of a slave arm provided with an end effector.

FIG. 2 is a view illustrating a configuration of the slave arm with the end effector 16 attached. The slave arm 1 includes a pedestal 15, an arm part 13 supported by the pedestal 15, and a wrist part 14 which is supported at a tip end of the arm part 13 and to which the end effector 16 is attached. As illustrated in FIG. 2, the slave arm 1 is an articulated robotic arm having six joints JT1-JT6, and is constructed by sequentially coupling a plurality of links 11a-11f. In more detail, at the first joint JT1, the pedestal 15 and a base-end part of the first link 11a are coupled to each other rotatably on an axis extending in the vertical direction. At the second joint JT2, a tip-end part of the first link 11a and a base-end part of the second link 11b are coupled to each other rotatably on an axis extending in the horizontal direction. At the third joint JT3, a tip-end part of the second link 11b and a base-end part of the third link 11c are coupled to each other rotatably on an axis extending in the horizontal direction. At the fourth joint JT4, a tip-end part of the third link 11c and a base-end part of the fourth link 11d are coupled to each other rotatably on an axis extending in the longitudinal direction of the fourth link 11c. At the fifth joint JT5, a tip-end part of the fourth link 11d and a base-end part of the fifth link 11e are coupled to each other rotatably on an axis perpendicular to the longitudinal direction of the link 11d. At the sixth joint JT6, a tip-end part of the fifth link 11e and a base-end part of the sixth link 11f are rotatably coupled to each other in a twisted fashion.

A mechanical interface is provided to a tip-end part of the sixth link 11f. An end effector 16 corresponding to the type of work is detachably attached to the mechanical interface. In this embodiment, the end effector 16 is a hand capable of holding a workpiece W described later (see FIG. 7).

Moreover, in this embodiment, a first camera device 17 is provided to a tip end of the slave arm 1. The first camera device 17 is supported by a part of the slave arm 1 near the tip end, for example, by a support part 18 fixed to the sixth link 11f. The first camera device 17 is disposed so as to be oriented in a direction extending from the sixth joint JT6 to the end effector 16. That is, the first camera device 17 is disposed so as to image the workpiece W which is an object to be held by the end effector 16, before and after holding.

The arm part 13 of the slave arm 1 is comprised of a coupling body of the links and joints, including the first joint JT1, the first link 11a, the second joint JT2, the second link 11b, the third joint JT3, and the third link 11c, described above. Moreover, the wrist part 14 of the slave arm 1 is comprised of a coupling body of the links and joints, including the fourth joint JT4, the fourth link 11d, the fifth joint JT5, the fifth link 11e, the sixth joint JT6, and the fourth link 11f, described above.

The joints JT1-JT6 are each provided with a drive motor M (see FIG. 6) as one example of an actuator which relatively rotates two members connected through the joint. For example, the drive motor M is a servo motor which is servo-controlled by the control device 3. Moreover, the joints JT1-JT6 are each provided with a rotation sensor E (see FIG. 6) for detecting a rotational position of the drive motor M, and a current sensor C (see FIG. 6) for detecting current which controls the rotation of the drive motor M. For example, the rotation sensor E is an encoder.

Figure 3:
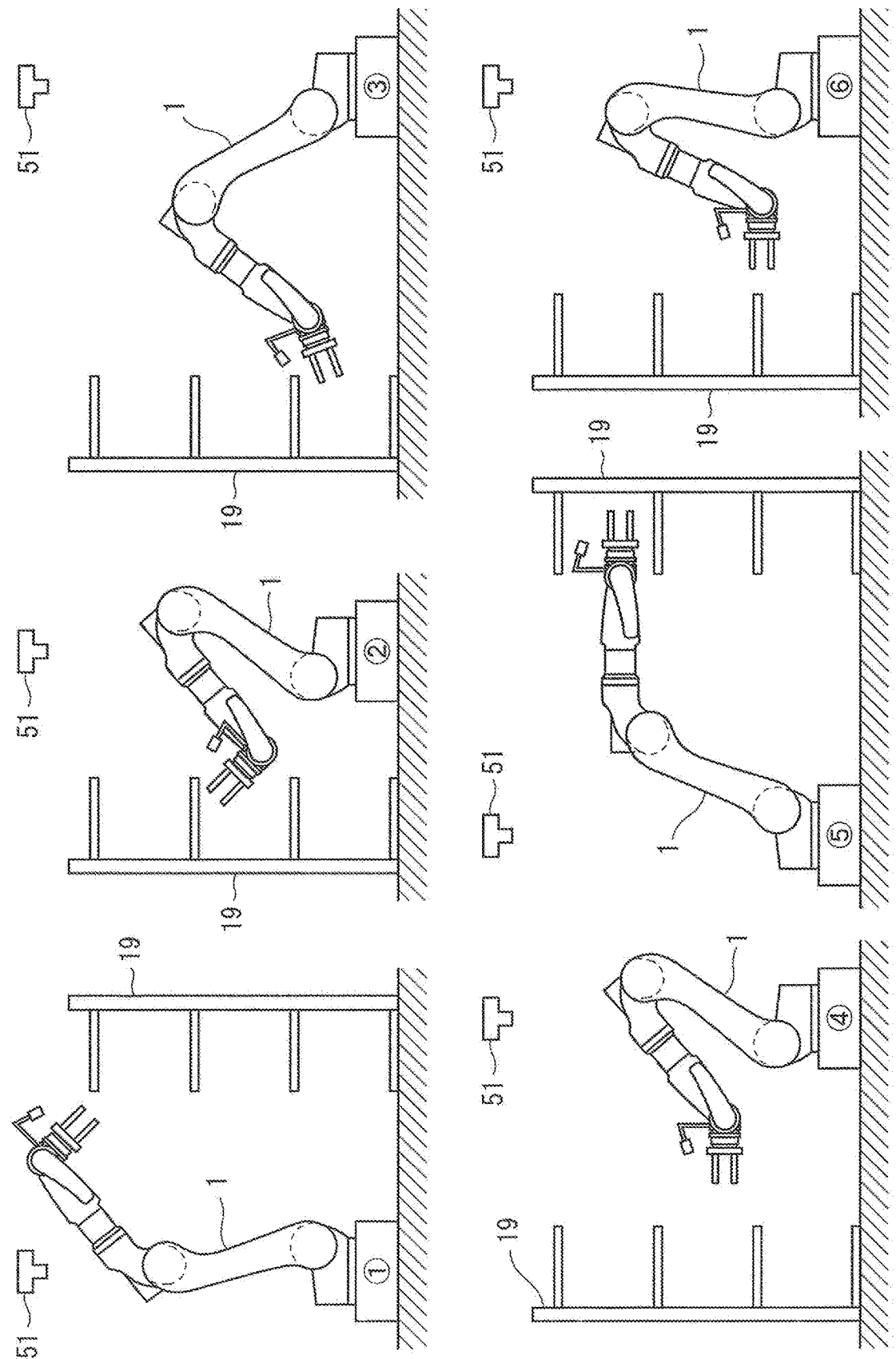
FIG. 3 is a view illustrating a plurality of slave arms and a work environment for the slave arms.

FIG. 3 is a view illustrating a plurality of slave arms 1 and a work environment for the slave arms. In this embodiment, for example, the slave arms 1 are disposed near respective shelves 19 provided in a warehouse. Each slave arm 1 performs a work to hold the workpiece W in the container placed on the shelf 19 one by one and to take out the workpiece W from the container.

For example, the control device 3 illustrated in FIG. 1 includes a processor (not illustrated), such as a microcontroller, an MPU, a PLC (Programmable Logic Controller), or a logic circuit, and a memory 6 comprised of such as a ROM and a RAM. The control device 3 is provided with a motion controller 31 and a request generator 32 (see FIG. 5) as its functional blocks. For example, these functional blocks are implemented by the processor of the control device 3 reading and executing a program stored in the memory 6. The motion controller 31 controls operation of the slave arm 1 in response to operation information from the corresponding master arm 2 which will be described later. The request generator 32 generates an operation request for requesting the operation information. These will be described later in detail.

(Configuration of Operator Interface System)

Figure 4:
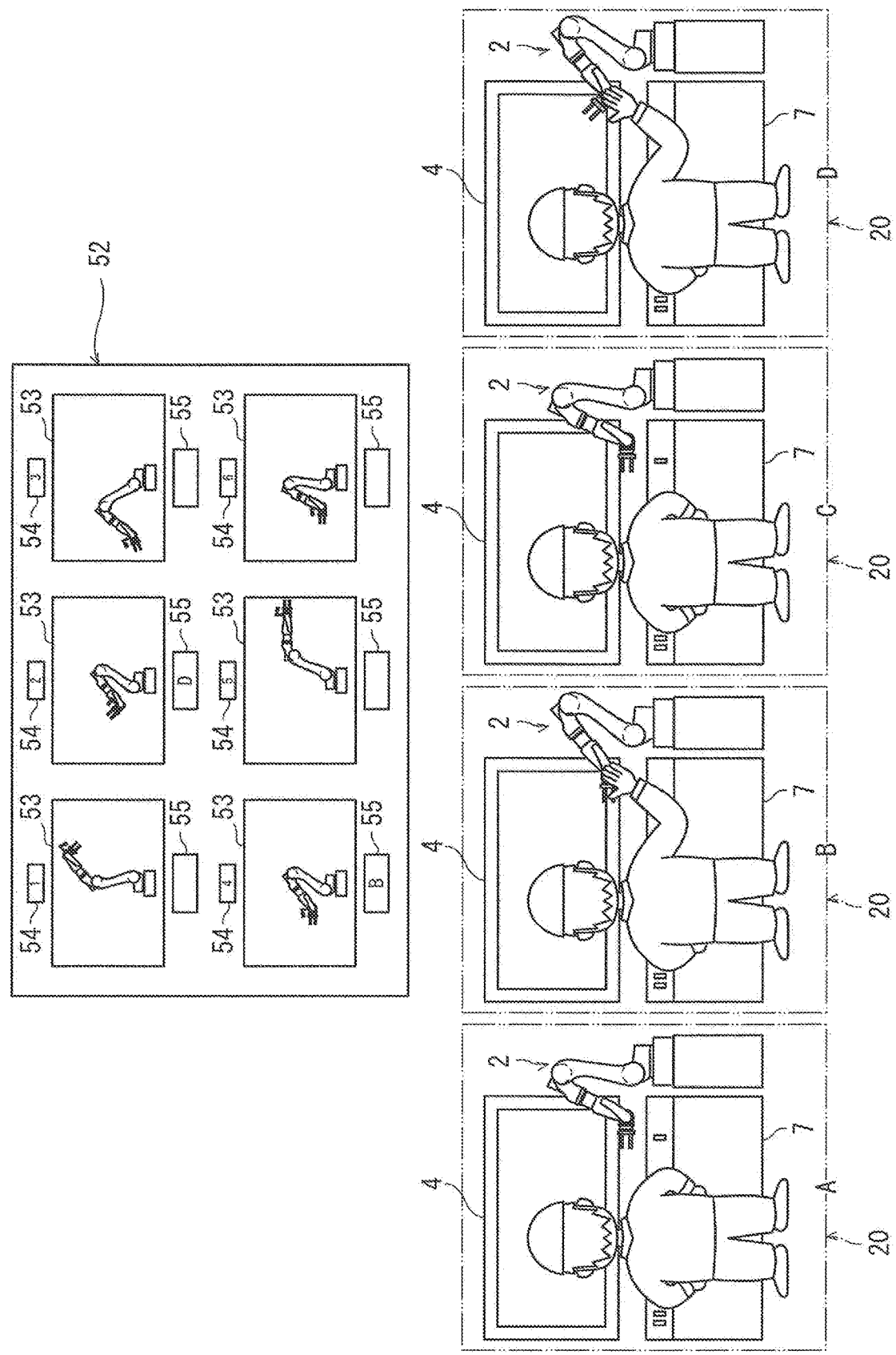
FIG. 4 is a view illustrating an environment of operators stationed at operator interface systems.

Next, the operator interface systems 20 are described with reference to FIG. 4. FIG. 4 is a view illustrating an environment of the operators stationed at the operator interface systems 20. Each operator interface system 20 includes the master arm 2 described above, an input device 7, and a first monitoring device 4. The first monitoring device 4 is a monitor for displaying an image which is imaged by the first camera device 17. In this embodiment, although the four operator interface systems 20 have the same configuration, they may have different configurations.

The master arm 2 is a device which is installed outside the workspace of the slave arm 1 and accepts an operational instruction from the operator. Since the master arm 2 has a similarity structure to the slave arm 1, description of the configuration of the master arm 2 is omitted. However, the master arm 2 may have a non-similarity structure to the slave arm 1. The operational information is generated by moving the master arm 2, and the generated operational information is sent to the control device 3 through the operation permitting device 8. In the robot system 100 of this embodiment, when the operational information is sent to the control device 3 while the operation mode in which the slave arm 1 is operated is the manual mode, the slave arm 1 is controlled by the control device 3 so that it follows the motion of the master arm 2. When the operational information is sent to the control device 3 while the operation mode in which the slave arm 1 is operated is the correctable automatic mode, the operation of the slave arm 1 in the middle of the automatic operation is corrected using the operational information. The master arm 2 corresponds to an "operation device" of the present disclosure.

The input device 7 is installed outside the workspace together with the master arm 2, and accepts the operational instruction from the operator. The input device 7 is configured to be operable, and, for example, it includes a switch, an adjustment knob, a control lever, or a potable terminal such as a tablet computer. The input device 7 includes an operation target selector 71, a mode selector 72, and an operational information selector 73.

The operation target selector 71 accepts an operation for selecting one from the plurality of slave arms 1. Thus, it requests, the operation permitting device 8 described later, for a permission to operate the selected slave arm 1 as an operation target based on the operational information from the corresponding master arm 2. The mode selector 72 and the operational information selector 73 will be described later in detail.

(Second Camera Device and Second Monitoring Device)

Returning to FIG. 1, the robot system 100 further includes a plurality of (in the illustrated example, six) second camera devices 51, and the second monitoring device 52. As illustrated in FIG. 1, the six second camera devices 51 are provided corresponding to the six slave robots 10. Each second camera device 51 is installed in the space where the corresponding slave arm 1 is provided. Each second camera device 51 is disposed at a position slightly distant from the slave arm 1 so that it images a work situation of the corresponding slave robot 10.

The six second camera devices 51 are all connected to the second monitoring device 52. The second camera device 51 and the second monitoring device 52 may not be directly connected to each other, or may be connected through another device. Moreover, the second camera device 51 and the second monitoring device 52 may be connected to each other wiredly or wirelessly.

The second monitoring device 52 is a monitor for the operators confirming the work situations of the slave arms 1. The second monitoring device 52 is installed in the space where the master arm 2 is provided, and at a position which is visible from each operator who operates the corresponding operator interface system 20. As illustrated in FIG. 4, the second monitoring device 52 includes six display parts 53, six request informers 54, and six connection informers 55, corresponding to the six slave robots 10.

The images imaged by the six second camera devices 51 are displayed on the six display parts 53, respectively. Therefore, the operator can confirm the operations of the six slave arms 1 at once by watching the second monitoring device 52.

The request informer 54 receives the operation request from the request generator 32 of the control device 3, and informs that the request generator 32 generated the operation request. As illustrated in FIG. 4, in this embodiment, the request informer 54 is provided above the corresponding display part 53. Moreover, in this embodiment, the request informer 54 is a light emitter. By receiving the operation request from the control device 3, the request informer 54 corresponding to the control device 3 lights or blinks.

Therefore, the operator is informed that there is an operation request from the slave robot 10 corresponding to the request informer 54.

The connection informer 55 informs a connection relation between the slave robot 10 and the operator interface system 20. In more detail, the manipulation of the slave robot 10 from the operator interface system 20 becomes possible when permission is granted from the operation permitting device 8. When the operation permitting device 8 permits the operation of the slave robot 10, the connection informer 55 corresponding to this slave robot 10 informs the operator interface system 20 of which the operation of the slave robot 10 is enabled.

As illustrated in FIG. 4, in this embodiment, the connection informer 55 is a liquid crystal display provided below the corresponding display part 53, and displays the corresponding operator interface system 20 so as to be distinguishable from others. For example, in FIG. 4, "D" is displayed on the connection informer 55 corresponding to the request informer 54 denoting the number "2." This means that the operator interface system 20 corresponding to the indication of "D", and the slave robot 10 corresponding to the request informer 54 denoting the number "2" are connected to each other.

(Operation Permitting Device)

In this embodiment, the operation permitting device 8 has a determinator 81 which receives the permission request from the operation target selector 71 of the input device 7, and determines whether the permission is to be granted for the permission request. The operation permission device 8 enables the operation of the selected slave robot 10 based on the operational information from the corresponding master arm 2, when the determinator 81 grants the permission.

Figure 5:
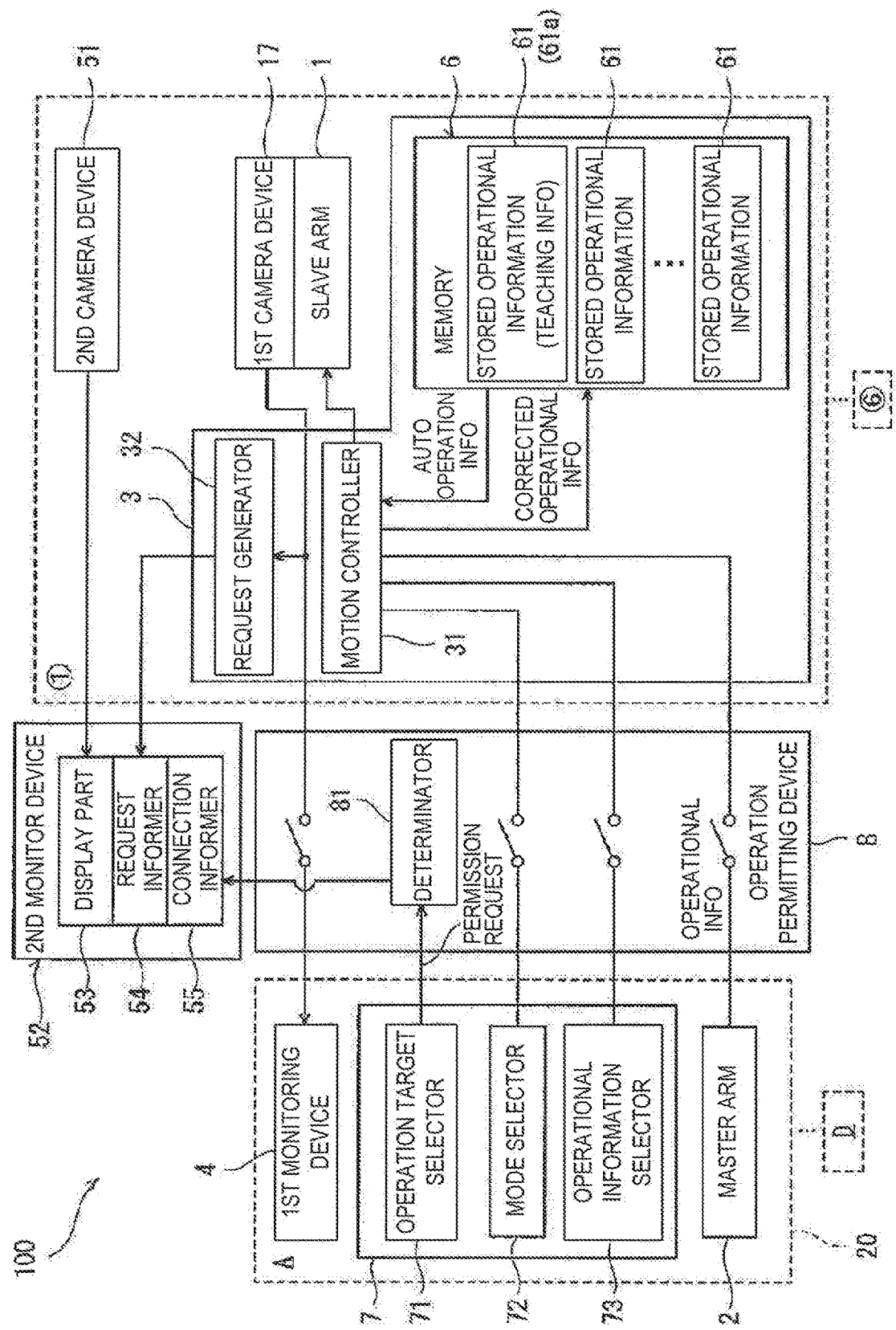
FIG. 5 is a schematic diagram illustrating a configuration of a control system of the robot system illustrated in FIG. 1.

FIG. 5 is a schematic diagram illustrating a configuration of a control system of the robot system 100. Note that, in FIG. 5, internal configurations of only one slave robot 10 and one operator interface system 20(A) are illustrated, and other slave robots 10 and other operator interface systems 20(B-D) are omitted. Moreover, the end effector 16 is also omitted in FIG. 5.

When the permission request is received from the operation target selector 71, and the operation of the slave robot 10 selected by the operation target selector 71 based on the operational information from a master arm 2 different from the master arm 2 corresponding to the operation target selector 71 is permitted, the determinator 81 prohibits the permission to the permission request, or otherwise, it grants the permission to the permission request.

In detail, when the determinator 81 issues the permission to the permission request from the operation target selector 71, the operational information generated by the master arm 2 of the operator interface system 20 including this operation target selector 71 is sent to the motion controller 31 of the slave robot 10 selected by the operation target selector 71. Moreover, when the determinator 81 permits the operation of the slave robot 10, it sends to the connection informer 55 information for identifying the operator interface system 20 which is now enabled to manipulate the slave robot 10.

Moreover, when the determinator 81 issues the permission to the permission request from the operation target selector 71, the image from the first camera device 17 which images the slave robot 10 selected by the operation target selector 71 is sent to the first monitoring device 4 of the operator interface system 20 including the operation target selector 71.

Moreover, when the determinator 81 issues the permission to the permission request from the operation target selector 71, the operational instruction to the mode selector 72 and the operational information selector 73 of the operator interface system 20 including the operation target selector 71 is sent to the motion controller 31 of the slave robot 10 selected by the operation target selector 71.

Moreover, when the determinator 81 issues the permission to the permission request from the operation target selector 71, the operational instruction to the mode selector 72 and the operational information selector 73 of the operator interface system 20 including the operation target selector 71 is sent to the motion controller 31 of the slave robot 10 selected by the operation target selector 71.

Note that, although in FIG. 5 each element (e.g., the master arm 2) of the operator interface system 20 and the element (e.g., the motion controller 31) of the control device 3 are connected with each other by the mechanical switch, this configuration is only illustrated schematically, and therefore, the present disclosure is not limited to this configuration.

As illustrated in FIG. 5, the mode selector 72 is for the operator to select the operation mode in which the slave arm 1 is operated from the automatic mode, the correctable automatic mode, and the manual mode described above. The operational information selector 73 is to select operational information used by the motion controller 31 when operating the slave arm 1 in the automatic mode or the correctable automatic mode from a plurality of operational information for operating the slave arm 1.

The memory 6 of the control device 3 is a readable and writable recording medium, and information for causing the slave arm 1 to automatically perform a given operation is stored as the stored operational information 61. The stored operational information 61 does not need to be all the information required for causing the slave arm 1 to automatically perform the given operation, and may be a part of the information. Moreover, the stored operational information 61 may be any kind of information as long as it is information related to the operation of the slave arm 1. For example, the stored operational information 61 may be orbital information including time series data of rotational positions of the drive motor M, or may be path information indicative of the postures of the slave arm 1 (the rotational positions of the drive motor M) at intermittent time points of a given time interval. For example, the stored operational information 61 may include a speed of the slave arm 1 along the orbit.

At least one stored operational information 61 is stored in the memory 6, and, for example, one of the stored operational information is teaching information 61a which is stored by operating the slave arm 1 so that the slave arm 1 performs a given work by this teaching operation. Although in this embodiment the stored operational information 61 as the teaching information 61a is information which is stored by operating the master arm 2 to instruct the operation of the slave arm 1, it is not limited to this configuration but may be stored by using any kind of teaching methods. For example, the stored operational information 61 as the teaching information 61a may be information stored by using direct teaching. Note that although in the robot system 100 according to this embodiment the memory 6 is provided integrally with the control device 3, but it may be provided separately from the control device 3.

Below, a control of the operation of the slave arm 1 by the motion controller 31 is described with reference to FIG. 5.

One of the at least one stored operational information 61 stored in the memory 6 is sent to the motion controller 31 as automatic operational information for causing the slave arm 1 to operate automatically. Moreover, the operational information generated by operating the master arm 2 is sent to the motion controller 31.

The motion controller 31 uses one or both of the automatic operational information and the operational information according to the operation mode selected by the mode selector 72.

When the operation mode selected by the mode selector 72 is the manual mode, the motion controller 31 uses the operational information. In more detail, when the operation mode in which the slave arm 1 is operated is the manual mode, the motion controller 31 does not use the stored operational information 61 in the memory 6, but controls the operation of the slave arm 1 according to the operational information (inputted instruction) sent by operating the master arm 2.

Moreover, when the operation mode selected by the mode selector 72 is the automatic mode, the motion controller 31 uses the automatic operational information. In more detail, when the operation mode in which the slave arm 1 is operated is the automatic mode, the motion controller 31 does not use the operational information sent from the master arm 2, but controls the operation of the slave arm 1 using the automatic operational information sent from the memory 6 according to the preset task program.

Moreover, when the operation mode selected by the mode selector 72 is the correctable automatic mode, the motion controller 31 uses both the automatic operational information and the operational information. Note that, when the operation mode is the correctable automatic mode and the operational information is not sent to the motion controller 31, the motion controller 31 uses only the automatic operational information. In more detail, when the operation mode in which the slave arm 1 is operated is the correctable automatic mode, the motion controller 31 controls the operation of the slave arm 1 using both the automatic operational information and the operational information in response to the operational information received while the slave arm 1 is operating automatically using the automatic operational information. Therefore, the slave arm 1 performs operation related to the automatic operational information, i.e., operation corrected from the operation which is to be performed automatically.

Figure 6:
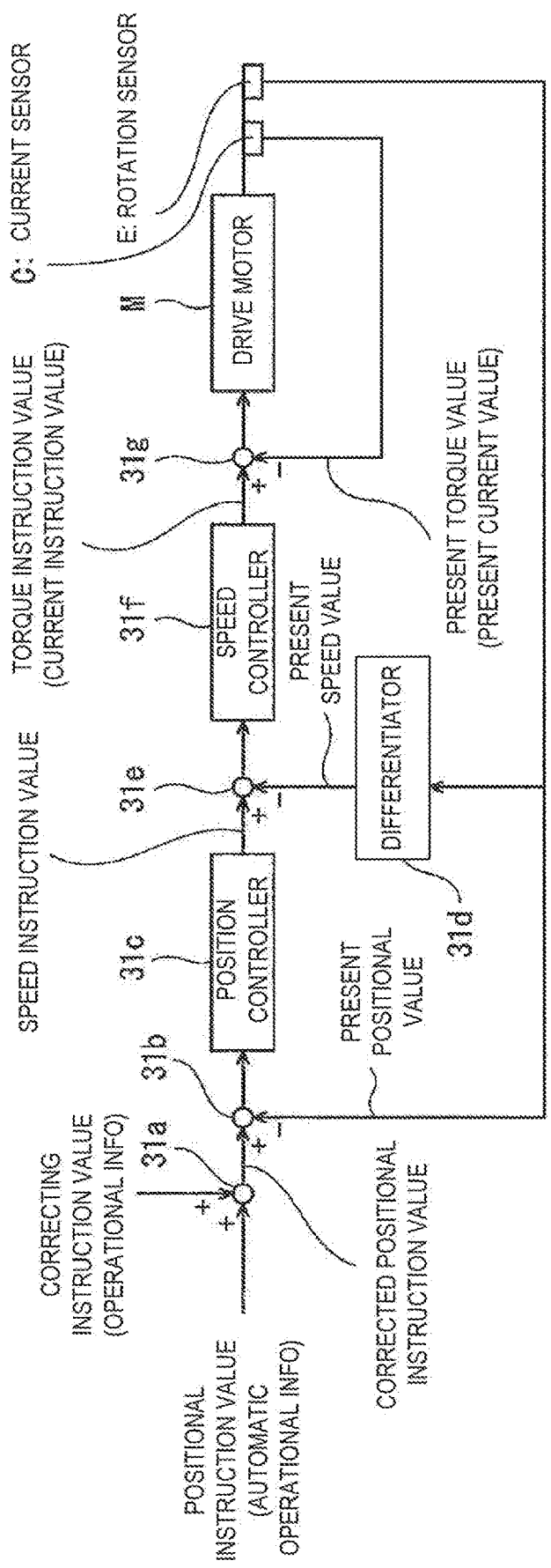
FIG. 6 is a view illustrating one example of a block diagram of the control system of a motion controller illustrated in FIG. 5.

Below, the correction of the operation of the slave arm 1 when the operation mode in which the slave arm 1 is operated is the corrected automatic operation mode is described with reference to FIG. 6. FIG. 6 is a view illustrating one example of a block diagram of the control system of the motion controller 31.

The motion controller 31 includes an adder 31a, subtracters 31b, 31e and 31g, a position controller 31c, a differentiator 31d, and a speed controller 31f, and controls the rotational position of the drive motor M of the slave arm 1 according to an instruction value based on the automatic operational information and an instruction value based on the operational information.

The adder 31a generates a positional instruction value which is corrected by adding the correction instruction value based on the operational information to the positional instruction value based on the automatic operational information. The adder 31a sends the corrected positional instruction value to the subtracter 31b.

The subtracter 31b subtracts a present position value detected by the rotation sensor E from the corrected positional instruction value to generate an angular deviation. The subtracter 31b sends the generated angular deviation to the position controller 31c.

The position controller 31c generates a speed instruction value from the angular deviation sent from the subtracter 31b by using calculation processing based on a given transfer function and a given proportionality coefficient. The position controller 31c sends the generated speed instruction value to the subtracter 31e.

The differentiator 31d differentiates the present position value information detected by the rotation sensor E to generate an amount of change in the rotational angle of the drive motor M per unit time, i.e., a present speed value. The differentiator 31d sends the generated present speed value to the subtracter 31e.

The subtracter 31e subtracts the present speed value sent from differentiator 31d from the speed instruction value sent from the position controller 31c to generate a speed deviation. The subtracter 31e sends the generated speed deviation to the speed controller 31f.

The speed controller 31f generates a torque instruction value (current instruction value) from the speed deviation sent from the subtracter 31e by using a calculation processing based on a given transfer function and a given proportionality coefficient. The speed controller 31f sends the generated torque instruction value to the subtracter 31g.

The subtracter 31g subtracts the present current value detected by the current sensor C from the torque instruction value sent from the speed controller 31f to generate a current deviation. The subtracter 31g sends the generated current deviation to the drive motor M to drive the drive motor M.

Thus, the motion controller 31 controls the drive motor M to control the slave arm 1 so that the slave arm 1 performs the operation corrected from the operation related to the automatic operational information. Note that, when the operation mode of the slave arm 11 is the automatic mode, the positional instruction value based on the automatic operational information is sent to the subtracter 31b, and when the operation mode of the slave arm 11 is the manual mode, the positional instruction value based on the operational information is sent to the subtracter 31b.

When the slave arm 1 performs the corrected operation, the memory 6 automatically stores the corrected operational information for causing the slave arm 1 to perform the corrected operation, as the stored operational information 61. However, when the slave arm 1 performs the corrected operation, the memory 6 may be selectable of whether the corrected operational information is to be stored as the stored operational information 61. In this case, for example, after the corrected operation of the slave arm 1 is finished, the control device 3 may inquire the input device 7 whether the corrected operation is to be stored.

The motion controller 31 can use the corrected operational information stored in the memory 6 as the stored operational information 61, as automatic operational information for the subsequent operations. In this embodiment, the motion controller 31 controls the operation of the slave arm 1 by using the latest stored operational information 61 stored in the memory 6 as the automatic operational information.

Next, one example of a flow of operation of the robot system 100 according to this embodiment is described. As illustrated in FIG. 3, suppose that the six slave robots 10 perform the work to take out the workpiece W from the shelf 19 in the automatic mode. If some of the slave robots 10 (e.g., the slave robot 10 at the center of the upper row in FIG. 2) illustrated in FIG. 3 become impossible to continue the work due to a certain reason, the request generator 32 of this slave robot 10 generates an operation request for requesting the operational information. The operation request is sent to the request informer 54 corresponding to this slave robot 10, and the request informer 54 then informs that there is an operation request from the request generator 32.

In response to the notification from the request informer 54, the operator operates the operation target selector 71 to select the slave robot 10 for which the operation request is issued. Thus, when the operation permitting device 10 grants permission to the permission request sent from the operation target selector 71, image information is sent to the first monitoring device 4 from the first camera 17 which images the corresponding slave robot 10.

Figure 7:
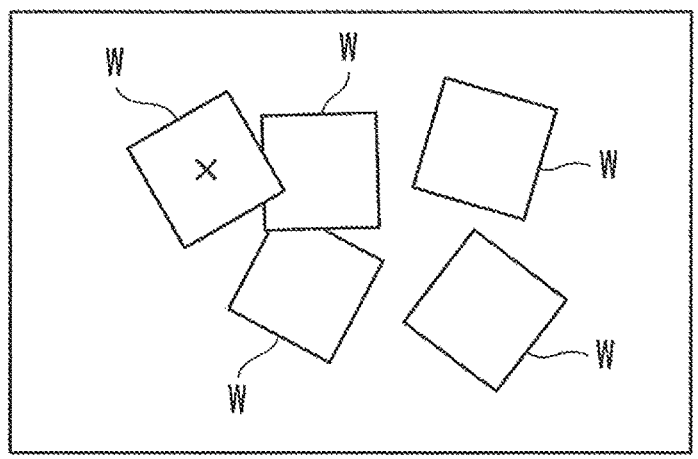
FIG. 7 illustrates one example of an image displayed on a second monitoring device.

FIG. 7 illustrates one example of the image displayed on the first monitoring device 4. The operator manually operates the master arm 2 while watching the first monitoring device 4 to take out the workpiece W from the shelf by using the slave robot 10.

Note that, in this embodiment, the operation mode of the motion controller is switched from the automatic mode to the manual mode or the correctable automatic mode at a timing where the request generator 32 generates the operation request. However, the timing at which the operation mode of the motion controller is switched is not limited to this configuration. For example when the operation permitting device 10 grants permission to the permission request sent from the operation target selector 71, a screen for urging the operator to select any one of the manual mode, the automatic mode, and the correctable automatic mode may be displayed on the first monitoring device 4. For this screen, the mode selector 72 may be operated to switch the operation mode.

Alternatively, the operator may operate not the master arm 2 but another operation device, while watching the first monitoring device 4. For example, the operation device may be configured so that the workpiece W, such as a mouse, which is displayed on the first monitoring device 4 and is a work object may be specified. For example, the top workpiece may be specified among the workpieces W displayed on the first monitoring device 4. The operational information may include workpiece information specified by the operation device, and the motion controller 71 may control the corresponding slave arm 1 so that this slave arm 1 automatically performs the work to the workpiece W specified by the operation device, in response to the operational information.

As described above, in the robot system 100 according to this embodiment, for example, even when an abnormality occurs to some of the plurality of slave robots 10 and the operation is to be switched to the manual operation, it is possible to operate all the slave robots 10 from one master arm 2, if the permission is granted from the operation permitting device 8. Therefore, it becomes unnecessary to prepare the same number of master arms 2 for the operators to operate the slave robots 10 as the number of slave robots 10.

Moreover, in response to the reception of the permission request from the operation target selector 71, when the slave robot 10 selected by the operation target selector 71 is permitted to operate based on the operational information from a different master arm 2 from the master arm 2 corresponding to the operation target selector 71, the permission to the permission request is prohibited. Thus, it is avoidable that one slave robot 10 is simultaneously manipulated from the plurality of master arms.

Therefore, the robot system suitable for remotely manipulating the plurality of robots can be provided.

Moreover, in this embodiment, since the request generator 32 generates the operation request for requesting the operational information, and the request informer 54 informs that the operation request is generated by the request generator 32, the operator is able to immediately know which slave robot 10 is requested by the operation request.

Moreover, in this embodiment, the operation of the slave arm 1 during operation is correctable on real time by using the master arm 2. Therefore, a partial correction of the operation of the slave arm 1 can be performed easily. Moreover, since the corrected operational information for performing the corrected operation is stored in the memory 6 as the stored operational information, the slave arm 1 can automatically perform the corrected operation, without the necessity of performing the correction by performing the same operation each time using the master arm 2. Therefore, the operation taught to the slave arm 1 is easily correctable.

Moreover, since in this embodiment the automatic mode is selectable by the mode selector 72 as the operation mode of the motion controller 31, if the correction of the operation of the slave arm 1 is not needed, the automatic mode can be selected to prevent that the master arm 2 is operated unintentionally and the operation of the slave arm 1 is corrected. Moreover, since the manual mode is selectable by the mode selector 72 as the operation mode of the motion controller 31, the slave arm 1 can be operated, without using the stored operational information 61 stored in the memory 6.

Moreover, in this embodiment, since the motion controller 31 controls the operation of the slave arm 1 using the latest stored operational information stored in the memory 6 as the automatic operational information, each time the correction of the slave arm 1 is repeated using the master arm 2, the operation of the slave arm 1 can be gradually brought close to the target operation.

The motion controller 31 does not necessarily use the latest stored operational information 61 stored in the memory 6 as the automatic operational information. For example, the operational information selector 73 may select the stored operational information 61 which is used by the motion controller 31 as the automatic operational information, from a plurality of stored operational information 61 stored in the memory 6. In this case, the same stored operational information 61 may be used each time as the automatic operational information until another stored operational information 61 which is used as the automatic operational information is selected by the operational information selector 73. According to this configuration, even when the latest stored operational information 61 stored in the memory 6 is not optimal as the information for operating the slave arm 1, the operational information selector 73 can use the stored operational information 61 when the correction is made appropriately as the automatic operational information.

Moreover, the robot system 100 may be provided with a status information acquirer (not illustrated) which acquires status information indicative of a situation of the slave arm 1 in the workspace, and the motion controller 31 may select and use the stored operational information 61 suitable for operating the slave arm 1 as the automatic operational information based on the status information acquired by the status information acquirer. For example, the status information includes the position or the posture of the slave arm 1 in the workspace, or information utilized for recognizing the situation around the slave arm 1. For example, the information utilized for recognizing the situation around the slave arm 1 is a time window or a timing where the slave arm 1 is operated, or temperature or humidity of the workspace. For example, when the slave robot 10 is a sealing robot which applies sealing agent with viscosity, the viscous resistance of the sealing agent may vary with working hours. In such a case, the stored operational information 61 suitable for the viscous resistance of the sealing agent is selected as the automatic operational information based on the status information, and therefore, the correction of the operation of the slave arm 1 can be made more easily.

Other Embodiments

The present disclosure is not limited to the embodiment described above, and various modifications are possible without departing from the spirit of the present disclosure.

Figure 8:
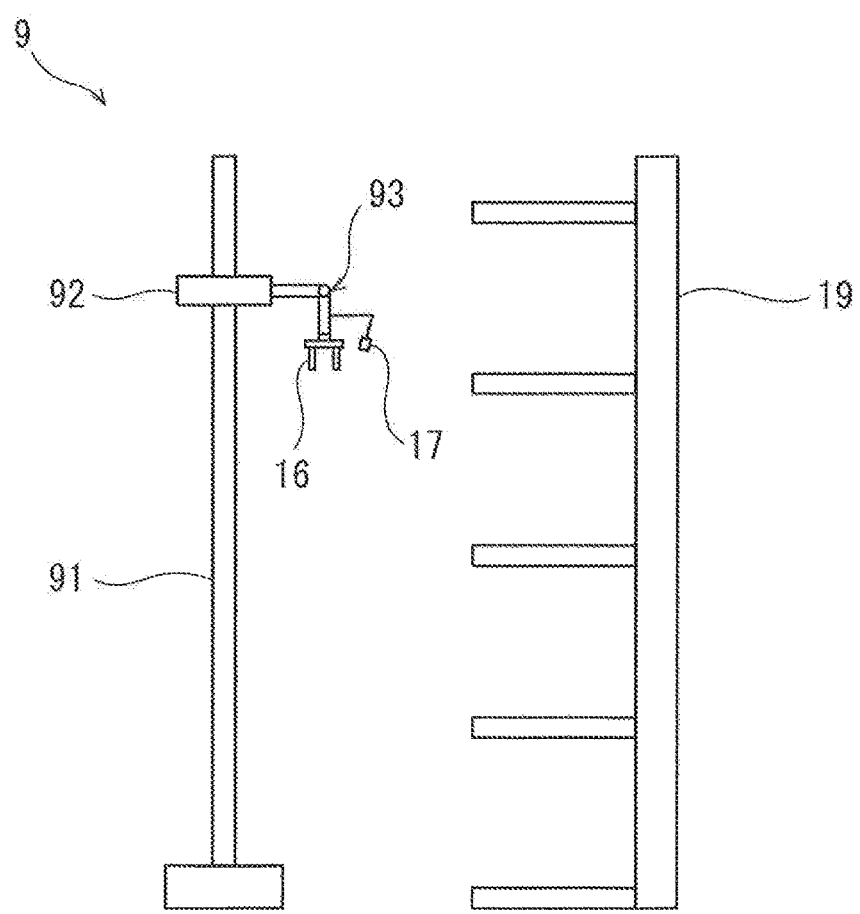
FIG. 8 is a view illustrating a robot body according to another embodiment.

For example, although in the above embodiment the articulated robotic arm having the six joints JT1-JT6 is illustrated as the robot body of the present disclosure, the robot body of the present disclosure is not be limited to this configuration, and may have any kind of configuration. FIG. 8 is a view illustrating a robot body 9 according to another embodiment. This robot body 9 includes a linear-motion part 92 which linearly moves along a pole 91 extending in the vertical direction, and an articulated robot 93 supported by the linear-motion part 92. In this case, the motion controller of the present disclosure may control not only the operation of the articulated robot 93 but the operation of the linear-motion part 92 in the vertical direction.

Moreover, although in the above embodiment the master arm 2 is described as one example of the operation device of the present disclosure, the operation device of the present disclosure may have another configuration, such as a joystick, for example.

Moreover, the configurations of the request informer 54 and the connection informer 55 are not limited to the configurations described above. For example, the request informer 54 may not be a light emitter, but may be a liquid crystal display which displays that there is a request. The request informer 54 and the connection informer 55 may not be provided to the second monitoring device 52, and may be provided to each operator interface system 20.

Moreover, although in the embodiment the operating parts, such as the mode selector 72 and the operational information selector 73 are provided to a single input device 7, they may be provided to different input devices.

DESCRIPTION OF REFERENCE CHARACTERS

1: Slave Arm
2: Master Arm
3: Control Device
4: First Monitoring Device
6: Memory
7: Input Device
8: Operation Permitting Device
10: Slave Robot
11: Slave Arm
16: End Effector
17: First Camera Device
31: Motion Controller
32: Request Generator
51: Second Camera Device
52: Second Monitoring Device
53: Display Part
54: Request Informer
71: Operation Target Selector
81: Determinator
100: Robot System

The invention claimed is:

1. A robot system comprising:
a plurality of robot bodies;
a plurality of operation devices configured to respectively accept operation by a plurality of operators and generate operational information for causing the robot bodies to operate;
a plurality of motion controllers provided corresponding to the plurality of robot bodies, respectively, and configured to control operation of the corresponding robot body in response to the operational information; and
a plurality of input devices provided corresponding to the plurality of operation devices, respectively, and configured to receive an operation for selecting any of the plurality of robot bodies,
wherein when any of the plurality of robot bodies is selected by a first input device of the plurality of input devices,
in response to a condition being satisfied that the robot body selected by the first input device is operated based on the operational information output from a second operation device of the plurality of operation devices that corresponds to a second input device of the plurality of input devices that is different from the first input device, the motion controller corresponding to the selected robot body does not control the operation of the selected robot body based on the operational information output from a first operation device of the plurality of operation devices that corresponds to the first input device, and
in response to the condition not being satisfied, the motion controller corresponding to the selected robot body controls the operation of the selected robot body based on the operational information output from the first operation device; and
wherein the robot system further comprises
a plurality of request generators provided corresponding to the plurality of motion controllers, respectively, and configured to generate an operation request for requesting the operational information; and
a plurality of request informers, wherein each of the plurality of request informers is configured to simultaneously inform all of the plurality of operators that one of the request generators generates the operation request, each request informer being one of a light emitter and a display, and each of the plurality of request informers being simultaneously visible to all of the plurality of operators when not informing of the operation request.

2. The robot system of claim 1, comprising a memory configured to store automatic operational information for causing each robot body to operate automatically,
wherein before the one of the request generators generates the operation request, an operation mode of the corresponding motion controller is an automatic mode in which the operation of the corresponding robot body is controlled using the automatic operational information, and when the one of the request generators generates the operation request, the operation mode is switched from the automatic mode to a manual mode in which the operation of the corresponding robot body is controlled using the operational information.

3. The robot system of claim 2,
wherein while each robot body operates automatically using the automatic operational information stored in the memory, the corresponding motion controller controls the operation of each robot body by using both the automatic operational information and the operational information, when the operational information is received from each operation device.

4. The robot system of claim 3, wherein each operation device is configured to be specifiable of a workpiece that is an object to be worked by the corresponding robot body, and the operational information includes workpiece information specified by each operation device, and wherein each motion controller controls the corresponding robot body in response to the operational information so that the corresponding robot body operates to perform a work to the workpiece specified by each operation device.

5. The robot system of claim 2, wherein each operation device is configured to be specifiable of a workpiece that is an object to be worked by the corresponding robot body, and the operational information includes workpiece information specified by each operation device, and wherein each motion controller controls the corresponding robot body in response to the operational information so that the corresponding robot body operates to perform a work to the workpiece specified by each operation device.

6. The robot system of claim 1, comprising a memory configured to store automatic operational information for causing each robot body to operate automatically, wherein while each robot body operates automatically using the automatic operational information stored in the memory, the corresponding motion controller controls the operation of each robot body by using both the automatic operational information and the operational information, when the operational information is received from each operation device.

7. The robot system of claim 6, wherein each operation device is configured to be specifiable of a workpiece that is an object to be worked by the corresponding robot body, and the operational information includes workpiece information specified by each operation device, and wherein each motion controller controls the corresponding robot body in response to the operational information so that the corresponding robot body operates to perform a work to the workpiece specified by each operation device.

8. The robot system of claim 1, wherein each operation device is configured to be specifiable of a workpiece that is an object to be worked by the corresponding robot body, and the operational information includes workpiece information specified by each operation device, and wherein each motion controller controls the corresponding robot body in response to the operational information so that the corresponding robot body operates to perform a work to the workpiece specified by each operation device.

9. The robot system of claim 1, further comprising at least one connection informer configured to inform the plurality of operators of whether or not each robot body is operable by any of the plurality of operation devices.

10. The robot system of claim 9, wherein when the selected robot body is operable by the first operation device corresponding to the first input device, the at least one connection informer informs the plurality of operators that the selected robot body is operable by the first operation device corresponding to the first input device, such that the first operation device corresponding to the first input device is identifiable.

11. The robot system of claim 1, wherein the plurality of request informers are provided on a single display device.

* * * * *